(12) United States Patent
Tao et al.

(10) Patent No.: US 11,713,087 B2
(45) Date of Patent: Aug. 1, 2023

(54) VEHICLE ACCESSORY

(71) Applicant: Liquivinyl LLC, Yorktown, IN (US)

(72) Inventors: Brian Tao, Canton, MI (US); Brenden Beshore, Yorktown, IN (US)

(73) Assignee: Liquivinyl LLC, Yorktown, IN (US)

( * ) Notice: Subject to any disclaimer, the term of this patent is extended or adjusted under 35 U.S.C. 154(b) by 0 days.

(21) Appl. No.: 17/105,798

(22) Filed: Nov. 27, 2020

(65) Prior Publication Data

US 2021/0155298 A1 May 27, 2021

Related U.S. Application Data (60) Provisional application No. 62/941,373, filed on Nov. 27, 2019.

(51) Int. Cl.
*B62D 35/00* (2006.01)
*B60R 19/48* (2006.01)

(52) U.S. Cl.
CPC ............ *B62D 35/005* (2013.01); *B60R 19/48* (2013.01); *B62D 35/007* (2013.01)

(58) Field of Classification Search
CPC .... B62D 35/00; B62D 35/005; B62D 35/007; B62D 35/02
USPC ...................... 296/180.1, 180.2, 180.3, 181.5
See application file for complete search history.

(56) References Cited

U.S. PATENT DOCUMENTS

| 5,924,763 | A  | * | 7/1999 | Daniels .................. | B62D 37/02 |
| | | | | | 296/180.1 |
| 7,661,753 | B2 | * | 2/2010 | Shinedling ........... | B62D 35/005 |
| | | | | | 296/180.5 |
| 2013/0026783 | A1 | * | 1/2013 | Kakiuchi ............... | B62D 35/02 |
| | | | | | 296/180.1 |
| 2019/0161123 | A1 | * | 5/2019 | Shen .................... | B62D 25/025 |

FOREIGN PATENT DOCUMENTS

GB          2440441 A * 1/2008 ............. B60R 19/48

OTHER PUBLICATIONS

Homemade splitter. TrackJunkies.org located at https://www.trackjunkies.org/topic/2597-homemade-splitters/ (Apr. 19, 2013). (Year: 2013).*
Plasti Dip for rear "S" spoiler; located at https://rennlist.com/forums/928-forum/1012867-plasti-dip-for-rear-s-spoiler-refurbish.html. (Year: 2017).*
Painted my rubber spoiler, located at https://www.thirdgen.org/forums/auto-detailing-appearance/169816-painted-my-rubber-spoiler.html. (Year: 2003).*

(Continued)

*Primary Examiner* — Jason S Daniels
(74) *Attorney, Agent, or Firm* — Faegre Drinker Biddle & Reath LLP (57) ABSTRACT

A vehicle accessory includes a body portion. The body portion is made substantially of aluminum composite material. The vehicle accessory further includes at least one connector for selectively attaching the body portion to a portion of an automobile. The body portion includes a front edge and a rear edge. The front edge is curved along at least (Continued)

a portion thereof. The front and rear edges are laterally opposed from each other. The rear edge extends substantially linearly from a first corner to a second corner. The first and second corners are formed at junctions between the front edge and the rear edge.

20 Claims, 6 Drawing Sheets

(56) References Cited

OTHER PUBLICATIONS

Rennlist.com—How to Make a Front Splitter (screenshots); located at https://rennlist.com/forums/racing-and-drivers-education-forum/576073-how-to-make-a-front-splitter-3.html. (Year: 2010).*
TruFiber Diffuser Fin Installation (screen shots); located at https://www.youtube.com/watch?v=K1G0h1v1BS4. (Year: 2019).*

* cited by examiner

VEHICLE ACCESSORY

CROSS-REFERENCE TO RELATED APPLICATION

The present application claims priority to U.S. Provisional Application Ser. No. 62/941,373, filed Nov. 27, 2019, the disclosure of which is expressly incorporated herein by reference.

BACKGROUND AND SUMMARY OF THE DISCLOSURE

The present disclosure relates to a vehicle accessory. More specifically, the present disclosure relates to a vehicle accessory made of aluminum composite material that is both lightweight and durable, thus comprising a resilient yet functional accessory able to increase the aerodynamic performance of a vehicle. Additionally, the present disclosure relates to a vehicle accessory that increases the aesthetic appearance of a vehicle.

Vehicle accessories that increase the aerodynamic performance of a vehicle are regularly implemented in high performance and recreational vehicles alike. Specifically, vehicle accessories may, among others, increase the fuel efficiency of a vehicle, the comfort of a driver or passenger while driving, and the aerodynamic effects of a vehicle. Additionally, vehicle accessories can increase the aesthetic appearance of a vehicle.

Illustrative types of vehicle accessories include, but are not limited to, front splitters, canards, side skirts, and diffusers. First, front splitters increase front-end downforce by sending the high-pressure air over the top of the vehicle, and the low-pressure air under the vehicle, thereby increasing overall vehicle traction and improving cornering and grip. Second, canards increase front-end downforce by deflecting the high-pressure air around the wheel well, where otherwise, it would become trapped, thereby increasing overall vehicle traction and improving cornering and grip as well. Third, side skirts increase overall downforce by lowering pressure under the car—speeding up air flow or removing the air all together, once more increasing vehicle traction and grip. Finally, diffusers tailor airflow from a high-speed dynamic under the vehicle to a much tamer ambient surrounding airflow, thereby reducing drag and increasing grip in the vehicle. All vehicle accessories noted also can increase the aesthetic appearance of the vehicle as well.

However, conventional vehicle accessories typically have two main flaws. First, conventional vehicle accessories made from metals, though being resilient to damage, increase the overall weight of the vehicle, leading to decreased fuel and aerodynamic efficiency. Thus, vehicle accessories made from metal sacrifice vehicle performance for resistance to heat. Additionally, metal vehicle accessories can decrease the aesthetics of the vehicle, in comparison to other materials.

Second, conventional vehicle accessories made from carbon fiber or the like can increase the overall performance of the vehicle more than its metal counterparts, but these accessories are often expensive and extremely fragile, and therefore are vulnerable to damage or breakage. For example, carbon fiber vehicle accessories have been known to be damaged upon minimal contact with parking blocks and the like.

Given the increased market for vehicle accessories, accessories that are resistant to damage or breakage, but do not sacrifice performance and aesthetics of a vehicle in the process and can be obtained at lower prices are desired. Accordingly, the present invention is intended to provide a vehicle accessory made of aluminum composite material that is lightweight, durable and less expensive, thus comprising a resilient yet functional accessory able to increase the performance and aesthetics of a vehicle.

The present disclosure provides a vehicle accessory for use with vehicles, such as automobiles. Specifically, the vehicle accessory is comprised of aluminum composite material, thereby decreasing the accessory's weight, without sacrificing resilience. The vehicle accessory is able to increase the performance of a vehicle by increasing the fuel efficiency of a vehicle, the comfort of a driver or passenger while driving, and the aerodynamic effects of a vehicle, while also being resistant to damage or breakage.

In an illustrative embodiment of the present disclosure, a vehicle accessory includes a front splitter configured to attach to the lower front portion of a vehicle. The front splitter comprises a body made substantially of aluminum composite material. The body includes a first portion, wherein holes may be disposed within the first portion, allowing for connection of the vehicle accessory to a bottom portion of a vehicle via a fixed connector. The body is also comprised of a second portion, which includes an end segment contoured to include a middle section that is substantially concave. The second portion end segment may be uniformly concave or may comprise of intermittent concave portions and convex portions. A protective rubber coating may be disposed on the end segment.

The illustrative front splitter further includes two connector types. First, the front splitter includes at least two adjustable length connectors illustratively spaced substantially equidistant with respect to the front splitter's second end (e.g., center axis). The adjustable length connectors illustratively include a first end for attachment to the front portion of a vehicle and a second end for attachment near the second end portion of the front splitter. The adjustable length connectors, when lengthened or shortened, are capable of raising or lowering the second end of the front splitter. Second, the front splitter illustratively includes at least one fixed connector, such as screws, bolts, push pin rivets, or the like.

The illustrative front splitter is made substantially of aluminum composite material. The aluminum composite material includes an upper layer of aluminum, disposed on the upper portion of a thermoplastic composite core. The aluminum composite material also includes a lower layer of layer of aluminum disposed on the lower portion of the thermoplastic composite core. The illustrative thermoplastic composite core, as mentioned above, is made substantially of polyethylene.

In another illustrative embodiment of the present disclosure, a vehicle accessory includes a canard configured to be selectively attached via at least one connector to the front portion of a vehicle. The canard includes a body made substantially of aluminum composite material. The body includes a first portion, which has a lip section wherein holes may be disposed throughout the lip section, allowing for connectors to attach the body of the vehicle accessory to the front portion (e.g., bumper) of a vehicle. The body also includes a second portion, extending outward from the first portion. The second portion is substantially concave, coming to a point at its end.

The illustrative canard further includes a connector extending through the holes that may be disposed within the first portion of the canard body, selectively attaching the canard body to the front portion of a vehicle.

The illustrative canard is made substantially of aluminum composite material. The aluminum composite material includes an upper layer of aluminum, disposed on the upper portion of a thermoplastic composite core. The aluminum composite material also includes a lower layer of layer of aluminum disposed on the lower portion of the thermoplastic composite core. The illustrative thermoplastic composite core, as mentioned above, is made substantially of polyethylene.

In yet another illustrative embodiment of the present disclosure, a vehicle accessory includes a side skirt configured to be selectively attached via the connector to the side bottom portion of a vehicle. The side skirt includes a body made substantially of aluminum composite material. The body includes a first portion, wherein holes may be disposed throughout the first portion, allowing for the connectors to attach the body of the side skirt to the side bottom portion of a vehicle. The first portion may also include an edge section, wherein recesses are disposed within the edge section at uniform distances. The body also includes a second portion, extending outward from the first portion. The second portion is illustratively substantially linear.

The illustrative side skirt further includes at least one connector extending through the holes that may be disposed within the first portion of the side skirt body, selectively attaching the side skirt body to the side bottom portion of a vehicle.

The illustrative side skirt is made substantially of aluminum composite material. The aluminum composite material includes an upper layer of aluminum, disposed on the upper portion of a thermoplastic composite core. The aluminum composite material also includes a lower layer of layer of aluminum disposed on the lower portion of the thermoplastic composite core. The illustrative thermoplastic composite core, as mentioned above, is made substantially of polyethylene.

In yet another illustrative embodiment of the present disclosure, a vehicle accessory includes a diffuser configured to be selectively attached via the connector to a rearward bottom portion of a vehicle. The diffuser includes a body made substantially of aluminum composite material. The body is comprised of a first portion, wherein holes may be disposed throughout the first portion, allowing for the connectors to attach the body of the diffuser to the rearward bottom portion of a vehicle. The body also includes a second portion, extending from the first portion. The second portion may also include at least one fin unit, extending outward from the diffuser body.

The illustrative diffuser further includes at least one connector extending through the holes that may be disposed within the first portion of the diffuser body, selectively attaching the diffuser body to the rearward bottom portion of a vehicle.

The illustrative diffuser is made substantially of aluminum composite material. The aluminum composite material includes an upper layer of aluminum, disposed on the upper portion of a thermoplastic composite core. The aluminum composite material also includes a lower layer of layer of aluminum disposed on the lower portion of the thermoplastic composite core. The illustrative thermoplastic composite core, as mentioned above, is made substantially of polyethylene.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

DETAILED DESCRIPTION

The embodiments of the invention described herein are not intended to be exhaustive or to limit the invention to the precise form disclosed. Rather, the embodiments selective for description have been chosen to enable one skilled in the art to practice the invention.

Figure 1A:
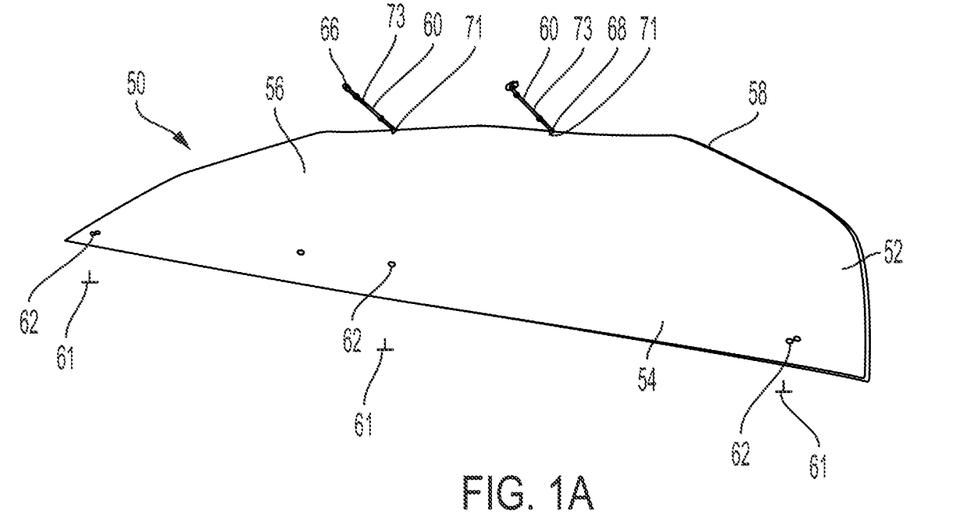
FIG. 1A is a disassembled perspective view of a first embodiment of a vehicle accessory of the present disclosure when disconnected from a vehicle, the vehicle accessory including a front splitter having a body, and at least one connector.
Figure 1B:
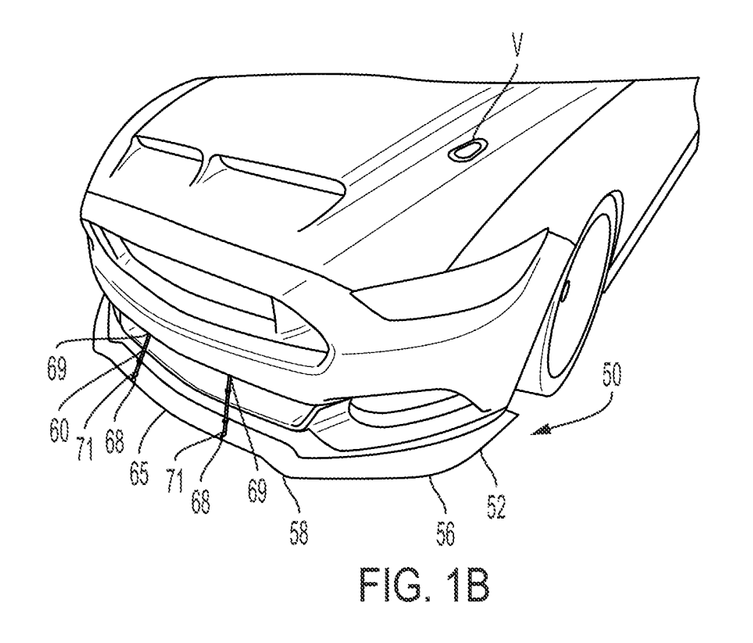
FIG. 1B is an assembled perspective view of the vehicle accessory of FIG. 1A, when connected to a vehicle.
Figure 1C:
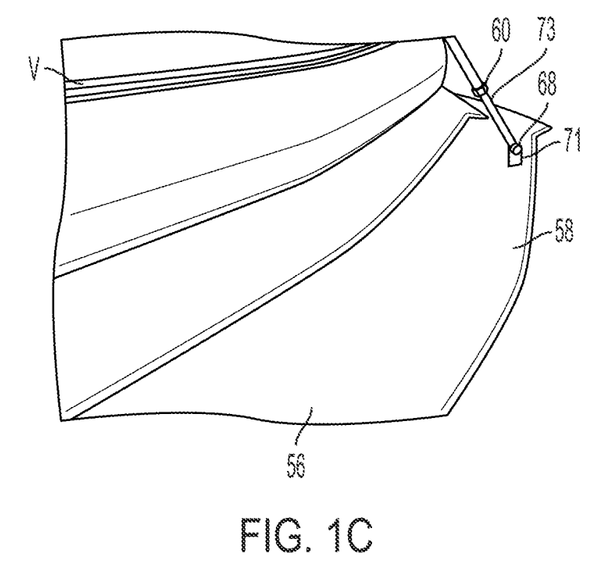
FIG. 1C is a detail view of the assembled vehicle accessory of FIG. 1A, when connected to a vehicle.

Referring initially to FIGS. 1A-1C, a vehicle accessory 50 in the form of a front splitter is disclosed for use with a vehicle V, such as an automobile. The vehicle accessory 50 includes a body 52 which is comprised of a first or rear portion 54 and a second or front portion 56, an end segment 58, adjustable length connectors 60, and fixed connectors 61. Each element of vehicle accessory 50 is described further below.

As mentioned above, body 52 illustratively includes the first portion 54, and the second portion 56 longitudinally spaced relative to the first portion 54. The first portion 54 is disposed substantially underneath vehicle V and represents approximately 67% of the vehicle accessory body 52. Holes 62 may be disposed throughout the first portion 54, so as to allow fixed connectors 61 to pass through the first portion 54. Fixed connectors 61 may also pass through holes in the underside of vehicle V, thereby selectively attaching first portion 54 to vehicle V. In the illustrative embodiment shown, fixed connectors 62 represent push lock rivets. In other embodiments fixed connectors 61 may be of a different style of connector, such as a screw, bolt, fastener, or the like.

Second portion 56 extends longitudinally outward (forward) from first portion 54 and makes up approximately 33% of the vehicle accessory body 52. Second portion 56 is partly disposed underneath vehicle V, and partly extends out from underneath vehicle V. Second portion 56 also includes a front end segment or edge 58. End segment 58 is contoured so as to include a middle or center section 65 that is substantially concave. The end segment 58 of second portion 56 may be uniformly concave or may be comprised of intermittent concave portions and convex portions. A protective rubber coating or trim may cover end segment 58.

The adjustable length connectors 60 are configured to attach the second portion 56 to the front portion of the vehicle V. Each adjustable length connector 60 illustratively includes a first end 66 and a second end 68. First end 66 is disposed through holes 69 in the front portion of vehicle V. Second end 68 is disposed through holes 71 in the second portion 56 of vehicle accessory body 52. The adjustable length connector 60 may be lengthened or shortened (illustratively through a threaded coupler 73), thereby capable of raising or lowering the second portion 56 of the vehicle accessory of vehicle accessory body 52.

Figure 3A:
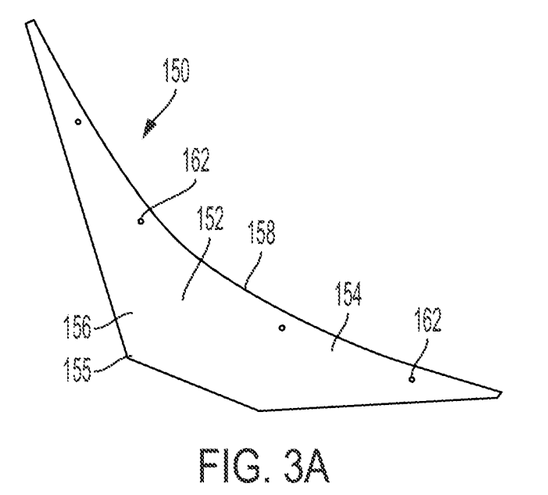
FIG. 3A is a disassembled perspective view of a second embodiment of a vehicle accessory of the present disclosure when disconnected from a vehicle, the vehicle accessory including a canard having a body, and at least one connector.
Figure 3B:
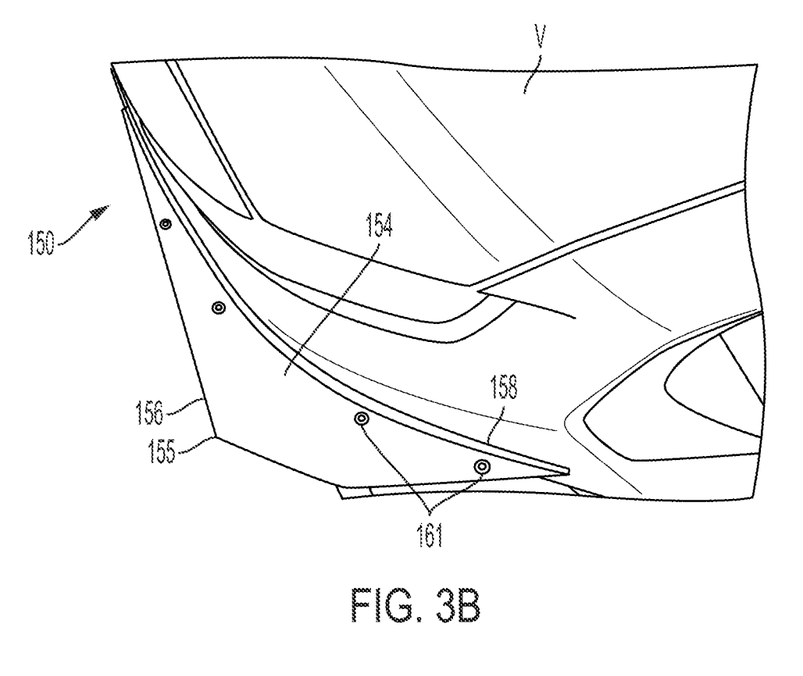
FIG. 3B is an assembled perspective view of the vehicle accessory of FIG. 3A, when connected to a vehicle.
Figure 3C:
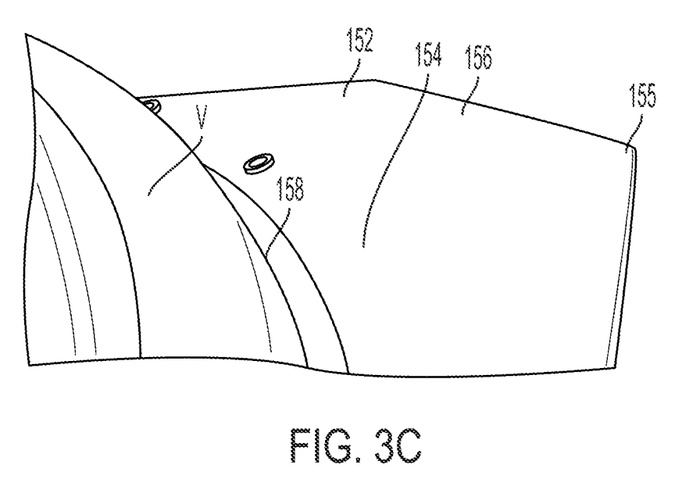
FIG. 3C is a detail view of the assembled vehicle accessory of FIG. 3A, when connected to a vehicle.

Referring to FIGS. 3A-3C, another embodiment of the vehicle accessory 150 in the form of a canard is disclosed. The vehicle accessory 150 has similarities in both the structure and operation as vehicle accessory 50. Like elements of the vehicle accessory 50 are identified by adding "100" to the corresponding reference number of the vehicle accessory 50.

Vehicle accessory 150 illustratively includes a body 152 having a first portion 154 and a second portion 156, a lip segment or edge 158, and fixed connectors 161. Each element of vehicle accessory 150 is described further below.

As mentioned above, the body 152 illustratively includes the first or rear portion 154 and the second or front portion 156 longitudinally spaced relative to the first portion 154. The first portion 154 is disposed nearest to the front portion of vehicle V and represents approximately 50% of the vehicle accessory body 152. The first portion 154 includes lip segment 158, wherein holes 162 may be disposed throughout lip segment 158 of first portion 154, so as to allow fixed connectors 161 to pass through the first portion 154. Fixed connectors 161 may also pass through holes in the front portion of vehicle V, thereby selectively attaching first portion 154 to vehicle V. In the illustrative embodiment shown, fixed connectors 161 represent push lock rivets. In other embodiments fixed connectors 161 may be of a different style of connector, such as a screw, bolt, fastener, or the like.

The body 152 of the vehicle accessory 150 also illustratively includes second portion 156, extending longitudinally outward (forward) from the first portion 154. The second portion 156 is substantially convex, coming to a point at an end segment 155. In the illustrative embodiment shown, body 152 forms a trapezoidal shape. In other embodiments, the body 152 may form a number of different shapes.

Figure 4A:
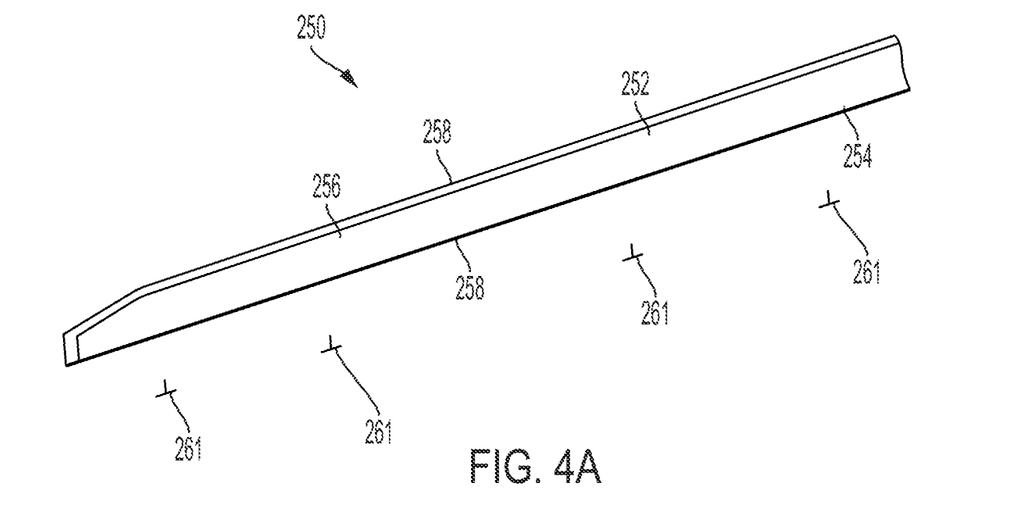
FIG. 4A is a disassembled perspective view of a third embodiment of a vehicle accessory of the present disclosure when disconnected to a vehicle, the vehicle accessory including a side skirt having a body, and at least one connector.
Figure 4B:
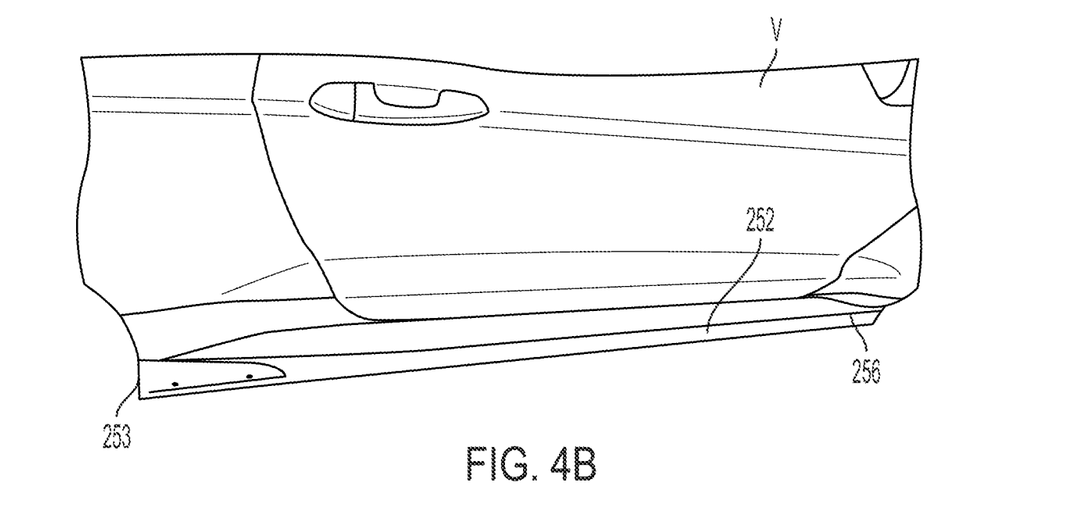
FIG. 4B is an assembled perspective view of the vehicle accessory of FIG. 4A, when connected to a vehicle.
Figure 4C:
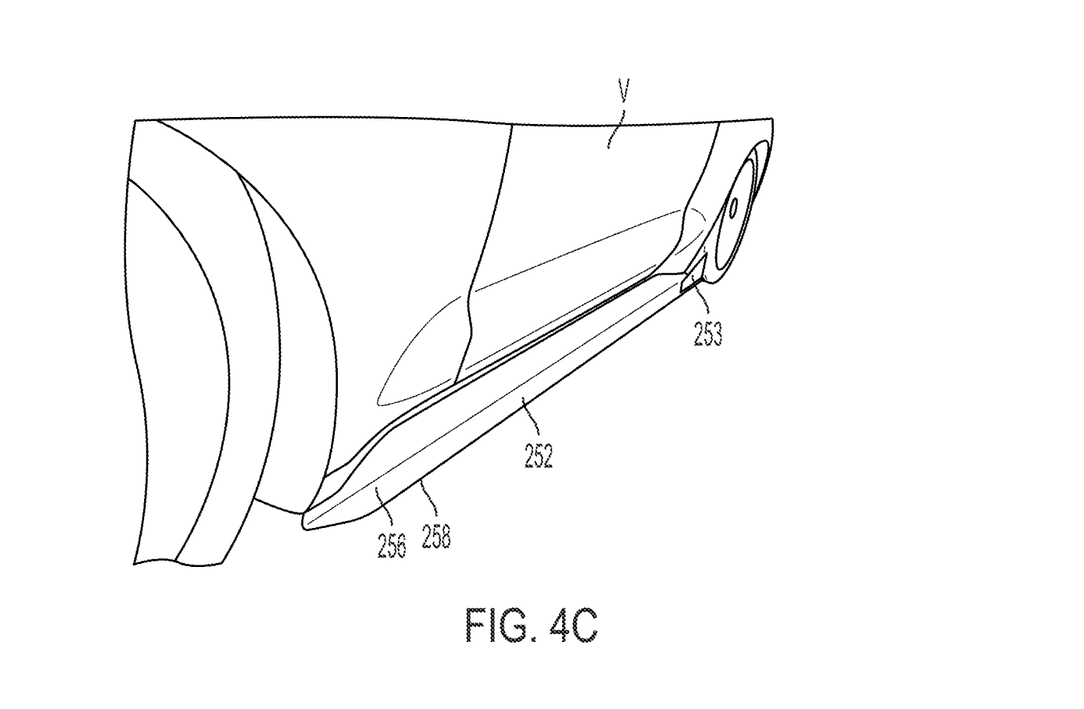
FIG. 4C is another assembled perspective view of the vehicle accessory of FIG. 4A, when connected to a vehicle.

Referring now to FIGS. 4A-4C, a vehicle accessory 250 in the form of a side skirt has similarities in both the structure and operation as vehicle accessory 50. Like elements of the vehicle accessory 50 are identified by adding "200" to the corresponding reference number of the vehicle accessory 50.

Vehicle accessory 250 illustratively includes a body 252 which is comprised of a first or inner portion 254 and a second or outer portion 256, an edge section 258, and fixed connectors 262. Each element of vehicle accessory 250 is described further below.

As mentioned above, illustrative body 252 of the vehicle accessory 250 includes the first portion 254 and the second portion 256 laterally spaced from the first portion 254. The first portion 254 is disposed underneath the side bottom portion of vehicle V and represents approximately 50% of the vehicle accessory body 252. Fixed connectors 261 may be disposed through holes made in the first portion 254. Fixed connectors 261 may also pass through holes in the underside of the side bottom portion of vehicle V, thereby selectively attaching first portion 254 to vehicle V. In the illustrative embodiment shown fixed connectors 261 represent push lock rivets. In other embodiments fixed connectors 261 may be of a different style of connector, such as a screw, bolt, fastener, or the like. The first portion may also include edge section 258, wherein inwardly extending recesses are illustratively disposed within edge section 258. In the illustrative embodiment shown, the recesses of edge section 258, are at uniform distances apart. In other embodiments, the recesses of edge section 258, may be at variable distances apart.

The body 252 of vehicle accessory 250 is also comprised of a second portion 256, extending laterally outward from the first portion 254. Second portion 256 protrudes out from the side of the vehicle V (and is thus not underneath it). Second portion 256 represents approximately 50% of the vehicle accessory body 252. In the illustrative embodiment shown, body 252 forms a substantially rectangular shape. In other embodiments, the body 252 may form a number of shapes. Second portion 256 may also include a fin 253 extending upward from the second portion 256.

Figure 5A:
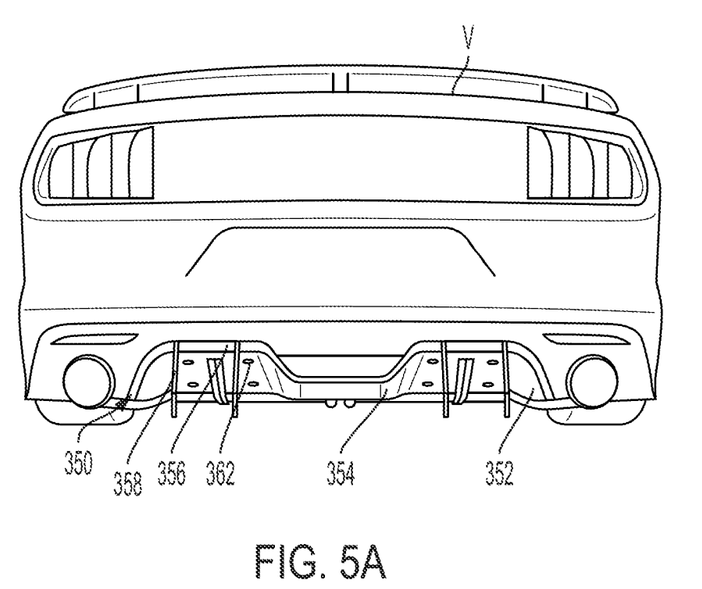
FIG. 5A is a perspective view of a fourth embodiment of a vehicle accessory of the present disclosure when connected to a vehicle, the vehicle accessory including a diffuser having a body, and at least one connector.
Figure 5B:
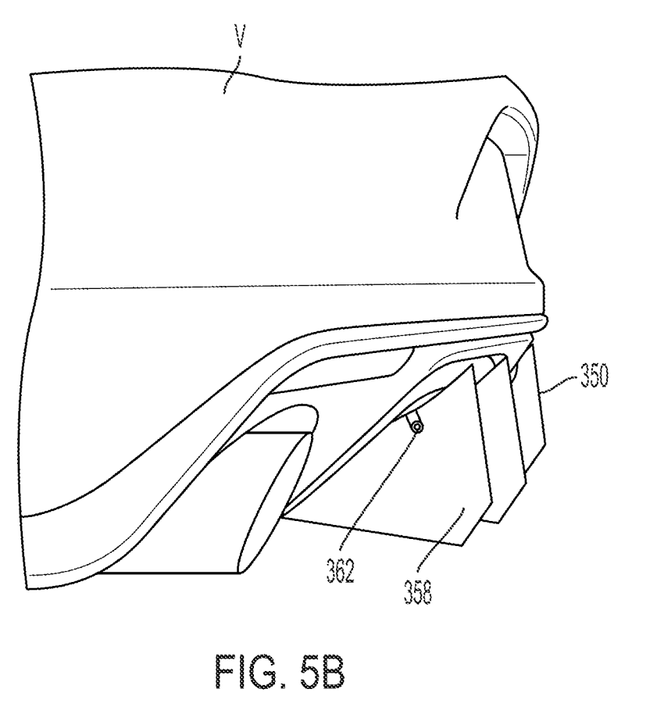
FIG. 5B is an assembled profile view of the vehicle accessory of FIG. 5A, when connected to a vehicle.

Referring now to FIGS. 5A and 5B, a vehicle accessory 350 in the form of a diffuser has similarities in both the structure and operation as vehicle accessory 50. Like elements of the vehicle accessory 50 are identified by adding "300" to the corresponding reference number of the vehicle accessory 50.

Vehicle accessory 350 illustratively includes a body 352 which is comprised of a first or front portion 354 and a second or rear portion 356, at least one fin unit 358, and fixed connectors 362. Each element of vehicle accessory 350 is described further below.

As mentioned above, illustrative body 352 of vehicle accessory 350 includes the first portion 354, and the second portion 356 longitudinally spaced relative to the first portion 354. The first portion 354 is disposed underneath the rearward bottom portion of vehicle V and represents approximately 67% of the vehicle accessory body 352. The first portion 354 may be contoured so as to coordinate with the rearward portion of the vehicle that it is disposed against. Fixed connectors 362 may be disposed through holes made in the first portion 354. Fixed connectors 362 may also pass through holes in the underside of the rearward bottom portion of vehicle V, thereby selectively attaching first portion 354 to vehicle V. In the illustrative embodiment shown fixed connectors 362 represent push lock rivets. In other embodiments fixed connectors 362 may be of a different style of connector, such as a screw, bolt, fastener, or the like.

Second portion 356 illustratively extends longitudinally outward (forward) from first portion 354 and makes up approximately 33% of the vehicle accessory body 352. Second portion 356 is partly disposed underneath vehicle V, and partly protrudes out from the rear of the vehicle V (and is thus not underneath it). Second portion 356 includes at least one fin unit 358. Fin unit 358 may extend either upward or downward from the second portion 356 of the body 352 of vehicle accessory 350.

Figure 2:
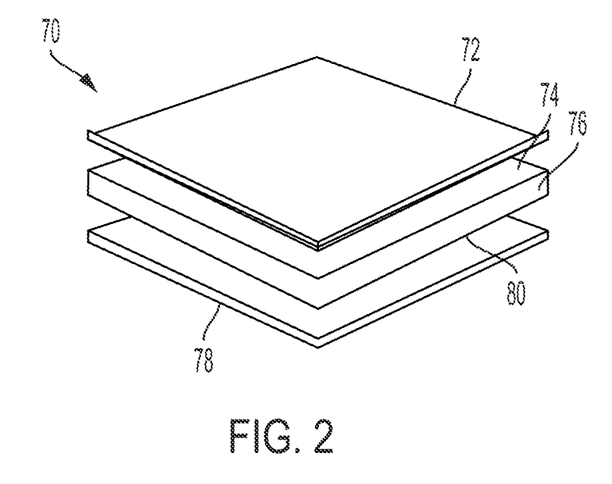
FIG. 2 is a partial exploded perspective view of aluminum composite material found in the vehicle accessory embodiments of the present disclosure.

Referring now to FIG. 2, the vehicles accessory of all embodiments detailed above (50, 150, 250 and 350) are made substantially (60% or more) of aluminum composite material 70. More particularly, the aluminum composite material of each illustrative body 52, 152, 252 and 352 is comprised of an upper layer of aluminum (or aluminum alloy) 72, disposed on the upper portion or surface 74 of a thermoplastic composite core 76. The aluminum composite material also includes a lower layer of layer of aluminum (or aluminum alloy) 78 disposed on the lower portion or surface 80 of the thermoplastic composite core 76. In other words, the thermoplastic composite core 76 is sandwiched between the upper layer of aluminum 72 and the lower layer of aluminum 78.

Illustratively, the upper layer 72 and the lower layer 78 are both formed of aluminum or an aluminum alloy. The thermoplastic composite core 76, as mentioned above, is made substantially (60% or more) of polyethylene. In an illustrative embodiment, the aluminum composite material 70 material ranges between 0.5 mm and 4.0 mm in thickness. In certain illustrative embodiments, each aluminum layer 72 and 78 has a thickness of between 0.05 mm and 0.1 mm. As such, the intermediate thermoplastic composite core 76 illustratively has a thickness of between 0.1 mm and 3.9 mm.

Although the invention has been described in detail with reference to certain preferred embodiments, variations and modifications exist within the spirit and scope of the invention as described and defined in the following claims.

What is claimed is:

1. A vehicle accessory comprising:
    a body portion, said body portion being made substantially of aluminum composite material, the aluminum composite material comprising a first layer, a second layer, and a substantially solid thermoplastic core disposed between the first layer and the second layer; and
    at least one connector for selectively attaching the body portion to a portion of an automobile,
    wherein the body portion includes a front edge and a rear edge, the front edge being curved along at least a portion thereof, the front edge being covered by a trim of protective rubber coating located only on the front edge,
    wherein the body portion forms a front splitter, said front splitter configured to be attached, via a first connector of the at least one connector, to a front portion of a vehicle, and said front splitter comprising a front edge and a rear edge, the read edge extending substantially linearly from a first corner to a second corner, the first and second corners being formed at junctions between the rear edge and the front edge.

2. The vehicle accessory of claim 1, wherein the at least one connector includes the first connector and a second connector, the first and second connectors being spaced substantially equidistant with respect to a center axis, the center axis extending from a midpoint of the rear edge to a midpoint of the front edge, each of the at least two adjustable length connectors having a first connector end attached to the vehicle and a second connector end attached to the front splitter near a leading portion of the front edge, and arranged to be capable of raising or lowering the front edge, in response to adjustment of the first and second connectors.

3. The vehicle accessory of claim 1, wherein the at least one connector comprises a plurality of connectors, and wherein the vehicle accessory further comprises a canard, said canard configured to be attached via a second connector of the plurality of connectors to a portion of the bumper of the vehicle.

4. The vehicle accessory of claim 3, wherein the accessory further comprises a side skirt, said side skirt configured to be attached via a third connector of the plurality of connectors to a side bottom portion of the vehicle.

5. The vehicle accessory of claim 4, wherein the accessory further comprises a diffuser, said diffuser forming a hole therein and comprising a fin unit configured to be attached, via a fourth connector of the plurality of connectors, to a rearward portion of the vehicle, through the hole.

6. The vehicle accessory of claim 1, wherein the aluminum composite material includes an upper layer of aluminum, a lower layer of aluminum, and a thermoplastic composite polyethylene core, said upper layer of aluminum being disposed on an upper portion of the thermoplastic composite polyethylene core, and said lower layer of aluminum being disposed on a lower portion of the thermoplastic composite polyethylene core.

7. The vehicle accessory of claim 6, wherein said aluminum composite material ranges between 0.5 mm and 4.0 mm in thickness.

8. The vehicle accessory of claim 1, wherein the connector includes at least one of a push lock rivet or an adjustable length support rod.

9. A vehicle accessory comprising:
    an accessory body including a rear edge and a front edge, the accessory body being made substantially of aluminum composite material, the aluminum composite material comprising a first layer, a second layer, and a substantially solid thermoplastic core disposed between the first layer and the second layer;
    said rear edge of the accessory body being configured for attachment to a bottom portion of a vehicle body;
    said front edge extending across a width of the vehicle body and the front edge being covered by a trim of protective rubber coating located only on the front edge; and
    at least two adjustable length connectors spaced substantially equidistant with respect to a center axis, the center axis extending from a midpoint of the rear edge to a midpoint of the front edge, each of the at least two adjustable length connectors having a first connector end attached to the vehicle body and a second connector end attached to the accessory body near a leading portion of the front edge, and arranged to be capable of raising or lowering the front edge in response to the adjustment of the length of the connector,
    wherein the rear edge extends substantially linearly from a first corner to a second corner, the first and second corners being formed at junctions between the rear edge and the front edge.

10. The vehicle accessory of claim 9, wherein the accessory body forms a front splitter, said front splitter is configured to be selectively attached via the connector to the front bottom portion of a vehicle.

11. The vehicle accessory of claim 9, wherein the front edge is uniformly convex or comprised of intermittent convex portions and concave portions.

12. The vehicle accessory of claim 9, wherein the trim of protective rubber coating is the only protective rubber coating on the accessory body.

13. The vehicle accessory of claim 9, wherein the aluminum composite material includes an upper layer of aluminum, a lower layer of aluminum, and a thermoplastic composite polyethylene core, said upper layer of aluminum being disposed on an upper portion of the thermoplastic composite polyethylene core, and said lower layer of aluminum being disposed on a lower portion of the thermoplastic composite polyethylene core.

14. The vehicle accessory of claim 13, wherein said aluminum composite material ranges between 0.5 mm and 4.0 mm in thickness.

15. A vehicle accessory comprising:
a diffuser, the diffuser including one or more fin units, and being made substantially of aluminum composite material, the one or more fin units each comprising four corners between which a side of the one or more fin units is defined; and
at least one connector for selectively attaching each of the one or more fin units to a portion of the diffuser, the at least one connector attaching to the side of the one or more fin units,
wherein the one or more fin units are configured to be attached, via the at least one connector, to a rearward portion of a vehicle.

16. The vehicle accessory of claim 15, wherein the four corners comprise a first corner, a second corner, a third corner, and a fourth corner, wherein each of the fin units comprise a first edge that extends between the first corner and the second corner, a second edge that extends between the second corner and the third corner, a third edge that extends between the third corner and the fourth corner, and a fourth edge that extends between the fourth corner and the first corner, the at least one connector being disposed proximate to the fourth edge.

17. The vehicle accessory of claim 15, wherein the one or more fin units are a plurality of fin units, and wherein each of the plurality of fin units are configured to be attached to the rearward portion of the vehicle, through respective holes formed in the diffuser.

18. The vehicle accessory of claim 15, further comprising a front splitter, the front splitter being configured to be attached to a front portion of the automobile, and the front splitter comprising a front edge with a protective coating disposed thereon and a rear edge that extends uniformly, from a first corner to a second corner, across a width of the front edge, the first and second corners being formed at junctions between the front edge and the rear edge.

19. The vehicle accessory of claim 18, further comprising a canard, the canard being configured to be attached to a bumper of the automobile.

20. The vehicle accessory of claim 15, wherein the one or more fin units are configured to be attached, via only the at least one connector, to the rearward portion of a vehicle.

* * * * *